(No Model.)

C. T. TOMPKINS.
STORAGE BATTERY.

No. 284,342. Patented Sept. 4, 1883.

Witnesses.

Inventor.
Cornelius T. Tomkins

UNITED STATES PATENT OFFICE.

CORNELIUS T. TOMKINS, OF NEW YORK, N. Y.

STORAGE-BATTERY.

SPECIFICATION forming part of Letters Patent No. 284,342, dated September 4, 1883.

Application filed December 5, 1882. (No model.)

*To all whom it may concern:*

Be it known that I, CORNELIUS T. TOMKINS, of the city, county, and State of New York, have invented a certain new and useful Method of and Apparatus for Storing Electric Energy, of which the following is a specification, reference being had to the annexed drawings, making part hereof, and in which—

Figure 1:
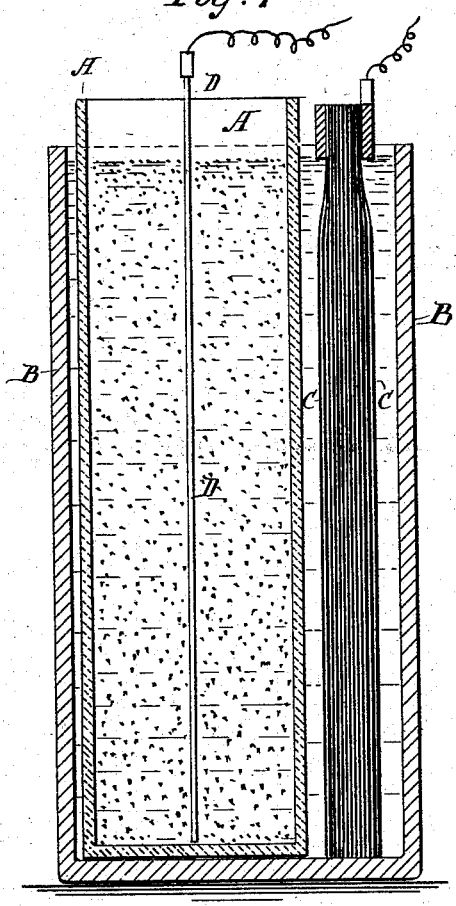
Figure 3:
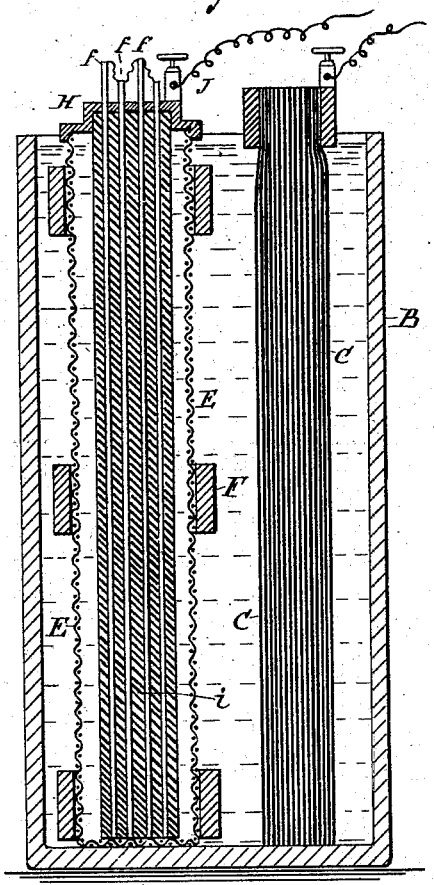
Figure 2:
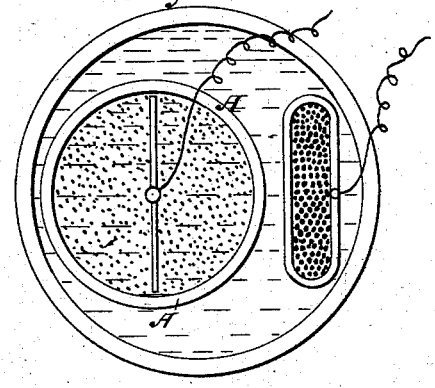

Figure 1 is a transverse vertical section, and Fig. 2 a top view, of the apparatus. Fig. 3 is a transverse vertical section, and Fig. 4 a top view, of a modified form of the same invention.

In the practice of my invention I begin by making a battery consisting of an ordinary porous cup, A, set into an ordinary eathern or glass battery-jar, B, the porous cup being at least of the same length or depth as the jar, but much less than the jar in diameter, so as to leave an annular space between it and the inclosing-jar. The porous cup I fill with a combination of pulverized charcoal and graphite, or gas-carbon, using the charcoal as an absorbent and the graphite or gas-carbon as a conductor of the current to and through the charcoal. I then fill the annular space between the cup and jar with the ordinary electrolytic fluid. I then place in the annular space containing the fluid a metal brush, C, composed of lead in the form of a fine fiber and long enough to reach to the bottom of the jar, and in the center of the cup containing the charcoal and graphite I place a strip of silver, D, long enough to reach to the bottom of the cup. I then connect the lead brush with the negative pole of the primary battery and the silver plate to the positive pole thereof. The circuit being thus established, the effect is to decompose the water of the fluid, the hydrogen being absorbed by the charcoal and the oxygen uniting with the lead until the battery is fully charged. In charging this battery the current from the primary battery must not be reversed through the storage-batteries, but must continue always in the same direction. To discharge the battery the conductors are connected to any electro-translating device, and the current flows until the energy of the battery is exhausted, the water being decomposed by charging and recomposed by discharging the battery. A battery made upon this plan charges up to 87 of the galvanometer very quickly, and retains its energy with very little or no loss while the circuit is broken, and when set to work upon any translating device delivers its energy with uniformity and economy.

In the construction of this battery neither graphite nor gas-carbon can be used as a substitute for charcoal, either animal or vegetable, and it will be observed that the graphite or gas-carbon is used merely as a conductor. It will not take the place of the charcoal as an absorbent of hydrogen. Its use for that purpose is to no purpose. A battery made of either of these carbons is of no value. It must be observed, also, that, inasmuch as the graphite is used merely as a conductor in organizing the battery, any other good conductor that will take its place—as a pulverent mixed with the charcoal—and will distribute the current well and evenly through the mass of charcoal, can be used as a substitute. Thus the same result can be obtained by means of a brush or exceedingly thin layers, made of any suitable metal and inserted in the cup containing the charcoal, the fibers of the brush or layers of metal being made to reach to the bottom of the cup and distributed well through the charcoal. Indeed both electrodes of the battery can be made in this way with very satisfactory results. Thus fill the porous cup with powdered charcoal, and fill also the annular space between the cup and jar with powdered charcoal. Insert one lead brush or thin layers of metal in the cup and another in the annular space, and saturate the charcoal with the electrolytic fluid, and the batteries will yield very satisfactory results, operating as I have described.

Figure 4:
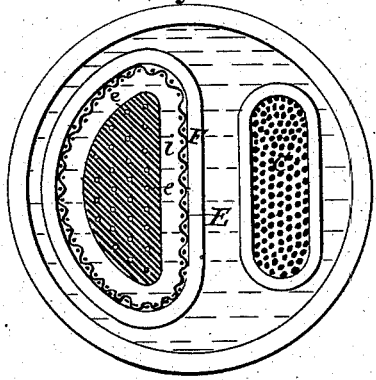

In Figs. 3 and 4 of the drawings a perforated lead cup, E, or a cup made of lead wire-cloth, is used as a substitute for the cup A in Figs. 1 and 2, the perforated lead cup being supported by rings F, made of wood or other suitable material; and, in place of the combined charcoal and graphite of Figs. 1 and 2, a solid piece of charcoal, *i*, is shown in Figs. 3 and 4. This piece of charcoal is filled with numerous perforations, *e*, in each of which a rod, *f*, or section of silver wire, is placed to diffuse the currents throughout the carbon block, and at the same time to avoid undue resistance in the circuit, the silver rods being of course electrically connected to each other and to the binding-post J of the electrode, the carbon and perforated lead cup being capped by a metal plate, H, in which the binding-post is set, and through which the silver rods pass in the manner shown. Figs. 1 and 2, involving precisely the same principle, are presented as mere modified forms of each other. Other modifications may be made of the two electrodes without departing from the spirit of my invention. Thus, for example, the carbon electrode may be made of filaments of charcoal bunched together in the form of a brush, one or both ends of which may be capped with metal to facilitate the electrical connection and formation of the circuits, &c., all of which modifications it is thought are within the scope of my invention.

In concluding this specification I observe that the successful operation of my battery depends entirely upon a thorough distribution of the current through the entire mass of charcoal, and to that end it is absolutely necessary that the conducting medium should be intimately mixed with or distributed through the charcoal, the operation of the battery depending upon the combination of a good conductor with a good absorbent in a form that will bring the two into close contact with each other through the entire body of the electrode, so as to permeate thoroughly its every part with the current and the hydrogen of the fluid.

Negative electrodes for storage-batteries have been heretofore made of a combination of a plate of graphite with powdered graphite; but graphite is not an absorbent of hydrogen in the form of a plate or in the form of powder, and, united in the two forms, does not produce a battery of any value. Negative electrodes have also been made by combining a plate of graphite with powdered charcoal; but such a combination is of no value, because, the graphite plate being a good conductor and the powdered charcoal a poor conductor, the current passes without permeating the charcoal, leaving no absorbed hydrogen in the charcoal, and consequently no electric energy in the electrode. My invention does not embrace or include an electrode made of graphite in either of the methods above mentioned. What distinguishes my electrode from theirs is the method of combining the conductor with the absorbent. In my case the electrode is composed of a powdered conductor (graphite) combined with a powdered absorbent, (charcoal,) the two being electrically connected to the circuit-conductor. In this way the current is made to permeate the absorbent through its entire mass, which is thus made effectual to take up the hydrogen of the fluid. The electrode may be made of powdered charcoal and powdered graphite, mixed together with sugar or other carbonaceous adhesive, and pressed into a solid mass; but this is merely putting the combined powders in a different form, and is a mere modification of the other method.

Having thus described my invention, I claim and desire to secure by Letters Patent—

1. In a storage-battery, the combination of a positive electrode composed of a lead brush with a negative electrode composed of a hydrogen absorbent, (charcoal,) combined with an electric conductor (graphite or metal) distributed throughout the mass of the absorbent, the two electrodes being saturated with and electrically connected by an electrolytic fluid, substantially as described.

2. In a storage-battery, the negative electrode, composed of charcoal having graphite or metal distributed throughout its mass, the charcoal serving as a hydrogen absorbent and the graphite or metal as an electric conductor, substantially as described, and for the purpose specified.

CORNELIUS T. TOMKINS.

Witnesses:
 WM. H. BROADNAX,
 J. EDGAR BULL.